United States Patent [19]

Berg

[11] 4,208,713
[45] Jun. 17, 1980

[54] ADDRESS AND BREAK SIGNAL GENERATOR

[75] Inventor: Åke K. Berg, Stockholm, Sweden

[73] Assignee: Telefonaktiebolaget L M Ericsson, Stockholm, Sweden

[21] Appl. No.: 878,011

[22] Filed: Feb. 15, 1978

[30] Foreign Application Priority Data

Mar. 1, 1977 [SE] Sweden ............................ 7702263

[51] Int. Cl.² ......................................... G06F 15/16
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,531,777 | 9/1970 | West | 364/900 |
| 3,566,363 | 2/1971 | Driscoll, Jr. | 364/200 |
| 3,699,529 | 10/1972 | Beyers | 364/200 |
| 3,715,729 | 2/1973 | Mercy | 364/200 |
| 3,988,716 | 10/1976 | Fletcher | 364/200 |

OTHER PUBLICATIONS

"Data Management in a Circular Buffer", IBM Tech. Disclosure Bull., vol. 20, No. 8, Jan. 1978, pp. 3307-3310.

*Primary Examiner*—Gareth D. Shaw
*Assistant Examiner*—E. Chan
*Attorney, Agent, or Firm*—Hane, Roberts, Spiecens & Cohen

[57] ABSTRACT

Two asynchronously operating computers which are each controlled by timing periods produced by its own clock are each provided with a pulse treatment circuit which in response to a break signal, interrupts the computer operation during the following timing period. A buffer memory is used in order to transfer information from the first to the second of the computers. Because of the asynchronism there is a risk that the buffer memory becomes either totally occupied or unoccupied. The risk is eliminated by means of an address and break signal generator which generates addresses to control writing and reading of the buffer memory and generates break signals which are sent to the pulse treatment circuit of the first and second computer in order to inhibit information from being sent to the buffer memory when it is full or drawn from the buffer memory when it is empty. The writing and reading addresses are generated by means of a first and a second circulating address counter stepped by the pulse treatment circuit of the first and second computer, respectively. The break signals are generated by means of a comparator connected to the two address counters. In addition the timing periods of the operating cycles have portions during which the computer components work unreliably due to their reaction times i.e., the setting of flip-flops, the ripple in counters, etc. Therefore, a reliability device compares the phases of the timing periods produced by the two computer clocks in order to allow only break signals which are generated owing to the comparison of addresses obtained in period parts during which both address counters are reliable.

3 Claims, 4 Drawing Figures

ADDRESS AND BREAK SIGNAL GENERATOR

BACKGROUND OF THE INVENTION

The present invention refers to an address and break signal generator for generating addresses, by means of which a buffer memory is activated for writing and reading, as well as break signals which are emitted to a sending computer system from which information for controlling a telecommunication equipment is sent to the buffer memory, and which break signals are emitted to a receiving computer system which receives such information from the buffer memory. The two systems each include a clock generator which is controlled by an oscillator of its own and generates a number of mutually phased displaced pulse series and is connected to a pulse treatment circuit in order to, due to break signals, suppress pulses in one of the pulse series which is chosen to indicate timing periods comprising first and second period parts during which the data treatment gives reliable and unreliable results, respectively. The timing periods are used for information transfer if associated pulses are not suppressed by the pulse treatment circuit. Although the oscillators of the computers nominally having the same frequency their frequency spacing gradually changes. It has been known for a long time how to accomplish information transfer between two asynchronously working computers by means of a so called first-in-first-out (FIFO) buffer memory. If the buffer memory has a theoretically infinitely large storing capacity and if the transfer time is allowed to be infinitely long so that this big buffer memory may be haif occupied before the first information is read the present asynchronism never causes any information losses due to insufficient buffer capacity or because of the fact that the buffer memory will be so emptied that the writing in of an information word coincides with its reading out. The problem has hithereto demanded an adaption of the buffer capacity and the transfer time to the asynchronism.

SUMMARY OF THE INVENTION

An object of the present invention is to render it possible to use a small buffer capacity with a consequently short transfer times.

The gist of the invention is to influence the asynchronism by means of break signals if there is a risk that the buffer memory will be over- or under-occupied. The break signals are generated in a reliable manner with respect to the sliding or shifting frequency spacing of the oscillators and with respect to the timing period parts which give an unreliable data treatment.

BRIEF DESCRIPTION OF THE DRAWING

Apparatus for realizing the invention is shown in the accompanying drawing wherein.

DESCRIPTION OF PREFERRED EMBODIMENTS

Figure 1:
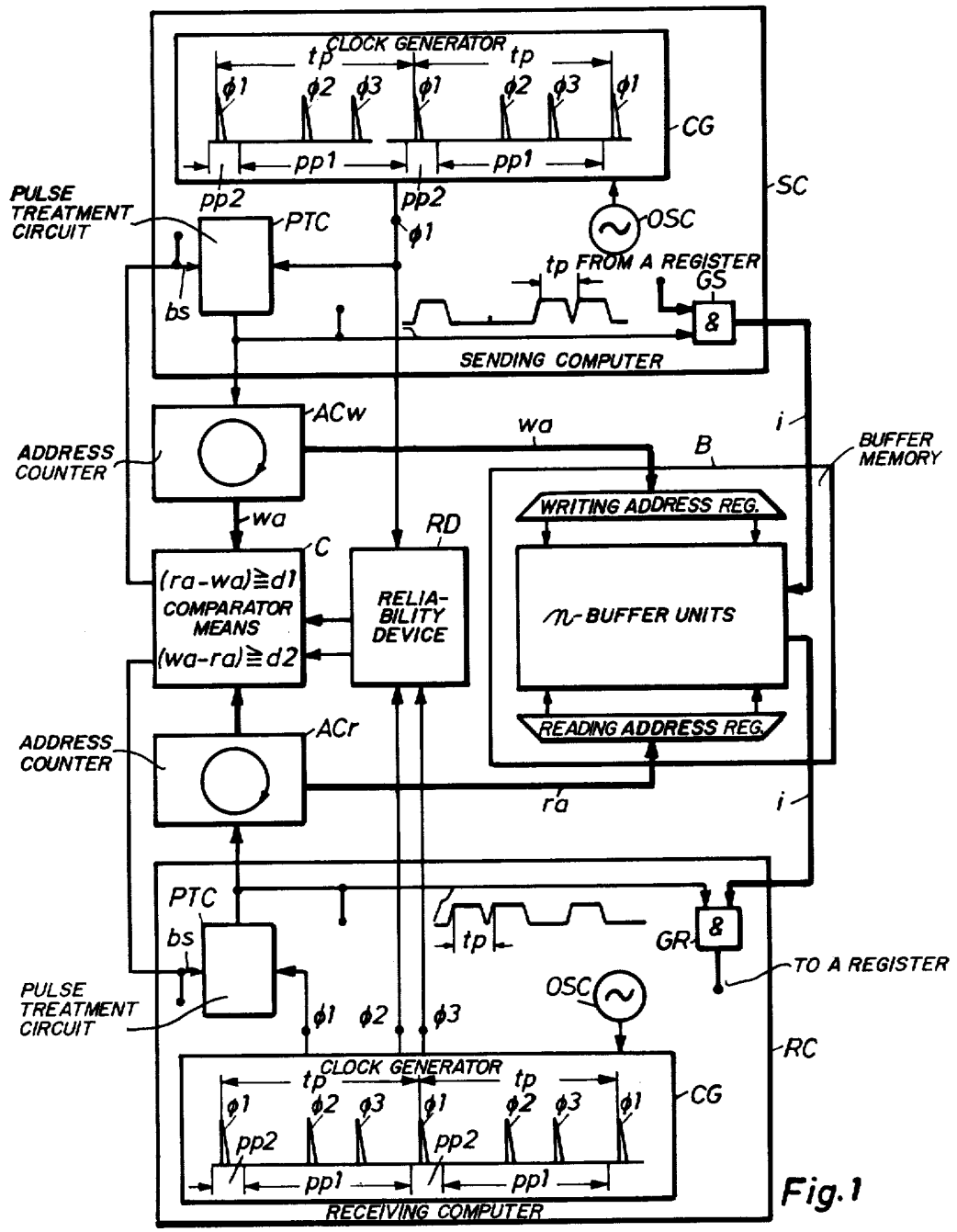
FIG. 1 is a block diagram which shows the main parts of the address and break signal generator and their connections to the computers as well as to the buffer memory.

FIG. 1 shows a buffer memory B through which data information is transferred from a sending computer SC to a receiving computer RC. Both computers which are included in a not-shown telecommunication equipment are controlled according to the same principle by means of oscillators OSC, clock generators CG and pulse treatment circuits PTC belonging to the respective system. In each system the respective clock generator CG which is connected to the oscillator OSC generates a number of pulse series which are mutually phase displaced. Of these pulse series only the series $\phi 1$, $\phi 2$ and $\phi 3$ are indicated. Such pulse series are used to determine timing periods tp which are divided into a number of phases. Reaction times, cycle times, transit times and transient times in the data processing devices of respective computer are obtained by means of the otherwise known phase dividing principle so that reliable data processing is obtained. The phase dividing itself is of no interest in connection with the present invention but FIG. 1 shows an embodiment where the timing periods tp are determined by means of the pulse series $\phi 1$ which control the pulse treatment circuits PTC of the respective computer. There is also shown a reliability device RD, hereinafter described, is fed with the pulse series $\phi 1$ which from the sending computer SC and with the pulse series $\phi 2$ and $\phi 3$ from the receiving computer RC. Each pulse treatment circuit PTC is provided with still another control input which receives break signals bs. The pulse treatment circuit PTC works such that it will emit in response to the receipt of a pulse of the $\phi 1$ series a pulse having the width of approximately the timing period tp unless at least one break signal bs is received in the timing period preceding the occurrence of the specific $\phi 1$ pulse. The use of the stretched pulses will be described below. In particular, as described below the reaction times in the pulse treatment circuits and in the devices which are controlled by them limit the reliability for an information transfer via the buffer memory. In FIG. 1 it is indicated in a magnified scale that the timing periods contain first and second period parts pp1 and pp2 during which a reliable and an unreliable control, respectively, is obtained. In the description of the operation which follows it is assumed that for five successive $\phi 1$-pulses the break signals of the sending computer have suppressed the second and the third pulses thereof and of the receiving computer for the third and the fifth pulses.

A computer generates internal break signals, for example, in order to prepare so called refresh operations which must be performed at regular intervals in the dynamic memory devices of the computer and during which the data processing is interrupted so that the buffer memory B neither receives any new information nor is allowed to emit stored information. This is symbolized in FIG. 1 by means of a sending gate GS arranged in the sending computer SC and by means of a receiving gate GR arranged in the receiving computer. This gates have their activation inputs connected to the pulse treatment circuit PTC of respective computer. The refresh operations are usually controlled by means of a timer which is independent of the respective clock generator CG. By means of such internal break signals the cooperation between the slowly and the rapidly working devices of the computer is regulated. Connected with the starting task of the present invention, it is important to state that the computer system is of such a type that the data processing is interrupted now and then during timing periods which are determined by means of the break signals.

The oscillators OSC of the computers have nominally the same frequency but their frequency spacing shifts or slips. Due to this slipping one of the two computers works continuously or at times faster or slower than the other. Consequently the slipping causes an asynchronism between the data processing operation of the computers. This asynchronism will now and then be increased or reduced by the internal break signals which are generated at odd times in the two computers. The resulting asynchronism influences the occupancy level of the buffer memory BA. If the information sending computer system works faster or slower than the information receiving computer system there is a risk that the buffer memory will be over occupied or under occupied, respectively, and consequently there is a risk of information loss. In order to achieve a lossfree information transfer between the asynchronously working computers an address and break signal generator according to the present invention is arranged which in addition to the reliability device RD comprises two address counters ACw, ACr and a comparator C which are connected to the buffer memory B and to the pulse treatment circuits PTC of the systems.

The address counter ACw has its stepping input connected to the pulse treatment circuit PTC of the sending computer P, its output connected to the writing address inputs of the buffer memory B and generates by means of a circulating counting means the write address numbers wa, wherein $1 \leq wa \leq n$, in order to activate each one of the n buffer units of the buffer memory to a write operator. Similarly the address counter ACr has its stepping input connected to the pulse treatment circuit PTC of receiving computer RC, its output connected to the reading address inputs of the buffer memory B and generates by means of a circulating counting means the address number ra, where $1 \leq ra \leq n$, in order to activate each one of the n buffer units of the buffer memory B to a read operator. With "circulating" it is meant that each leading edge which is received on the stepping input results in that the preceding address number is increased with one counting unit, but that the number 1 is obtained after the number n. In other words the counting means can be a modulo-n counter. The task of the comparator C is to continuously calculate the differences between the contents of the two address counters AC and consequently to supervise the occupancy level of the buffer memory B. It must not happen that the same buffer unit is activated at the same time for writing and reading. Therefore the buffer memory B is fully occupied if the information is written for example in the buffer unit with the address number n while the information is read from the buffer unit with the address number 1. Also the buffer memory must not be further emptied if, for example, the writing is effectuated by means of the address number 2 while the reading is effectuated by means of the address number 1. A difference limit d1 or d2 is obtained which indicates that there is a risk for over- or under-occupancy, respectively, of the buffer memory. Labelling the number of information occupied buffer units (ra−wa)=the number of buffer units in the circulation direction between the buffer unit activated for reading and the buffer unit activated for writing, the comparator C generates a break signal in order to suppress the following $\phi1$-pulse this break signal is emitted to the information sending computer, if $(ra-wa) \geq d1$. Similarly the number of information unoccupied buffer units is (wa−ra)=the number of buffer units in the circulation direction between the buffer unit activated for reading and the buffer unit activated for writing, the comparator C generates a break signal for suppressing the following $\phi1$-pulse. Such break signal is emitted to the information receiving computer if $(wa-ra) \geq d2$. Such a comparator C is obtained by using conventional logic elements. In order to calculate the number of occupied and unoccupied buffer units, for example, standardized arithmetic logic units labelled JEDEC (Joint Electron Device Engineering Council) 74181 can be used. In order to compare the difference limits with the calculation results of the arithmetic logic units and in order to generate break signals, comparator circuits labelled JEDEC 7485 can be, for example.

By means of the break signals of the comparator C a lossfree information transfer is obtained even if the buffer memory only comprises few buffer units. The smaller the buffer memory is the shorter the average data transfer time, but more frequently there is a risk of over- or under-occupancy. Each break signal which is generated by the comparator reduces the data processing capacity of the two computers if not anyhow during a respective timing period an internal break signal is sent to respective pulse treatment circuit. The larger the buffer memory is the greater the probability that the oscillator slipping changes its direction and that the internal break signals of the two computer systems compensate each other before the comparator generates a break signal. If the buffer memory is dimensioned to comprise n=8 buffer units, favorable conditions concerning both data transfer time and data treatment capacity are obtained in practice.

In addition to such points of view regarding the dimensioning of the buffer memory the reliability when the comparator generates break signals is of importance for a faultless information transfer between the asynchronously working computers. To write/read data information in/from the buffer memory is a data processing operation which is controlled by the sending-/receiving computer and is therefore as reliable as an arbitrary data processing operation which is performed in one single computer system. According to FIG. 1 the sending and receiving gates GS, GR are activated only during such reliable timing period parts pp1 comprising the phases intended for information writing and reading, during which phases the address counters AC transmit reliable address numbers wa, ra. The only device which is influenced by the asynchronous timing periods is the comparator C. If it is assumed that the comparator calculates the address number differences in instants which are always placed in the middle of the reliable timing period parts pp1 of the first computer, it occurs, due to the present oscillator sliding, that such instants now and then are placed in the unreliable timing period parts pp2 of the second computer. Breaking signals, which unnecessarily are generated due to unreliable contents in respective address counter result in a reduced data processing capacity. The break signals being missed in this manner result in an information loss at the data transfer time between the two computers. Consequently the above mentioned reliability device RD is an absolutely necessary part of an address and break signal generator. The general function of the device is, by means of a phase comparison between the timing periods of the computers, to insure that the comparator only sends such break signals to the pulse treatment circuits which are generated due to the reliable contents of the address counters.

A simple circuit solution for accomplishing this general reliability function comprises a bistable flip-flop and an AND-gate. A first phase position in the first computer system, which is obtained after a quarter of a reliable period part, is compared either to the corresponding first phase position of the second computer system or to a second phase position of the second system which is obtained after three quarters of the reliable period part. Such first phase position of the first system fed to an input of the flip-flop puts the bistable flip-flop into the one state which activates the first input of the AND-gate the second input of which is activated by means of the first or the second phase position of the second system. If the pulses which are generated on the output of the AND-gate are fed to the other input of the flip-flop they put the bistable flip-flop into its other state, these pulses have with certainty occured during reliable timing periods of the two systems and therefore they can be used to control the comparator. Thus the output of the AND-circuit would be fed to the control input of the comparator C. Such a simple reliability device is reliable regarding the unreliable period parts. However, if the phase position of the first system slips in alternating direction around the second phase position of the second system the control pulses of the AND-gate are generated in alternating phase positions in such a manner that one of two subsequent timing periods of the second system contains two control pulses while the other period does not contain any control pulse. If there is a risk for over- or under-occupancy respectively during such slipping, eventually two break signals are generated one timing period too late although one signal had been enough to compensate the asynchronism being caused by said type of sliding. Then the difference limit of the comparator has to be determined regarding the risk of delay. Furthermore, the superfluous break signal results in a reduced data processing capacity.

Figure 2:
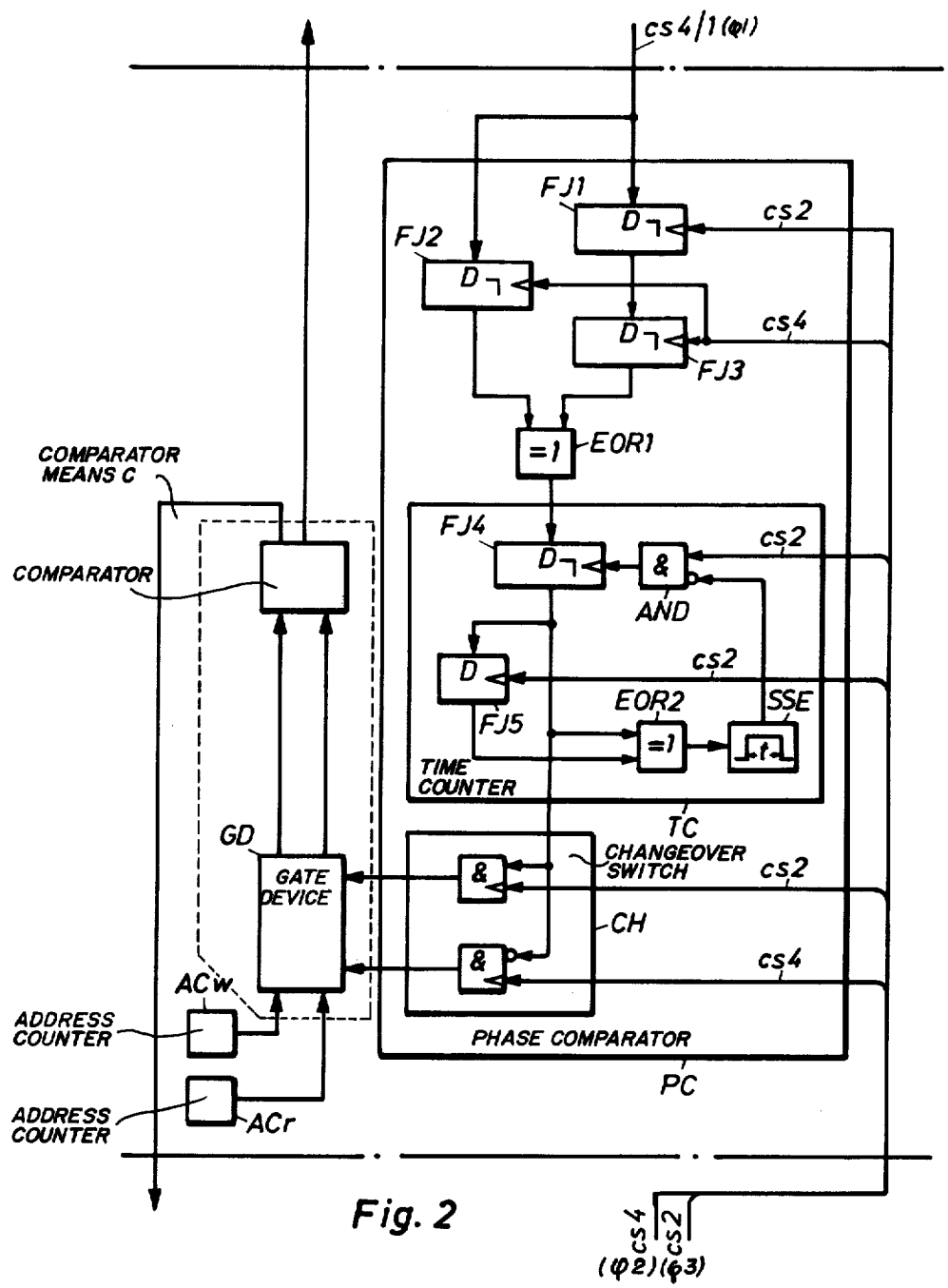
FIG. 2 mainly shows a phase comparator which together with a gate device is included in a reliability device.
Figure 3A:
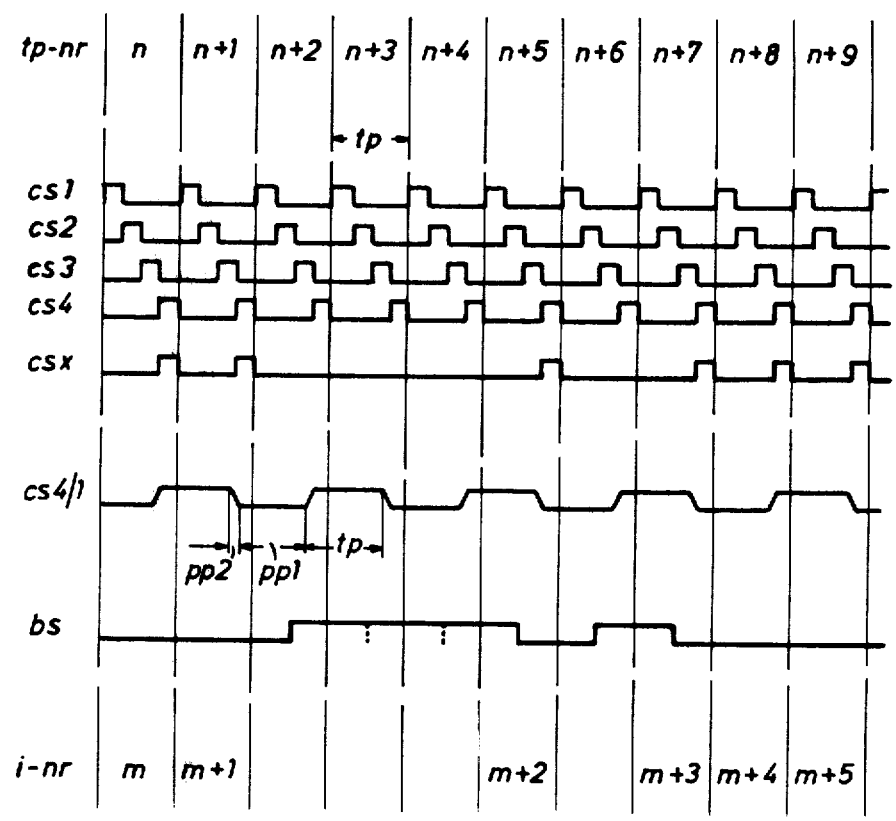
FIG. 3 shows timing diagrams to better understand the working method of the phase comparator.

FIG. 2 shows an improved reliability device in form of the phase comparator PC which includes: 3 conventional D-flip-flops FJ1, FJ2 and FJ3 for controlling a first exclusive-OR-gate EOR1; a time comparator TC; and a phase comparator PC. The operation of the improved reliability device is described by means of the timing diagram shown in FIG. 3. Of said D-flip-flops two, according to FIG. 2 the flip-flops FJ1 and FJ2, receive parallelly from the first computer a pulse series cs4/1 and from the second computer one each of two clock pulse series cs2 and cs4. The output terminal of flip-flop FJ1 drives an input terminal of flip-flop FJ3 while the output terminals of flip-flops FJ2 and FJ3 are connected to the input terminals of gate EOR1. The pulse series cs4/1 has pulses and intervals both being as long as a timing period and is generated—if such a pulse series is not already present in the computer—for example by means of a pulse treatment circuit (not shown in FIG. 2) which suppresses every second pulse in the above mentioned pulse series φ1 used to determine timing periods and which, as the pulse treatment circuits PTC shown in FIG. 1, prolongs unsuppressed pulses to a pulse having a width being approximately one timing period. Accordingly as shown in FIG. 3a the edge times between pulses and intervals of the pulse series cs4/1 include the unreliable period parts during which the address counter contains unreliable address numbers. (See interval pp2 of FIG. 3a). The two clock pulse series cs2 and cs4 respectively have pulses with leading edges which occur after one and after three quarters of the timing periods respectively and with a width of one quarter of a timing period. It is assumed that a timing period is divided into 4 phases so that the series cs2 and cs4 already are present and are used within the computer. The fact that the edges of the series cs2 and cs4 do not in reality have the infinite slope shown in FIG. 3a and that the trailing edges of the cs4 pulses occur during the unreliable period parts pp2 belonging to the second computer system does not influence the operating ability of the reliability device according to FIG. 2.

The D-flip-flops FJ1 and FJ2 are clocked by means of the trailing edges of the cs2 pulses the cs4 pulses respectively. The D-flip-flop FJ3 is connected in series with the D-flip-flop FJ1 and is clocked by means of the trailing edges of the cs4 pulses in order to obtain phase coincident changes of the logical states of the flip-flops FJ2 and FJ3 whose outputs are connected to respective inputs of the first exclusive-OR-gate EOR1. If the oscillator frequency of the first computer which determines the pulse series cs4/1 is higher than the oscillator frequency of the second computer which determines the clock pulse series cs2 and cs4, the first exclusive-OR-gate EOR1 changes its state from a logical "1" to a logical "0" and from "0" to "1", when the trailing edges of the cs2 series and cs4-series, respectively, are sliding over unreliable period parts of the pulse series cs4/1. If the oscillator frequencies slide in the opposite direction corresponding state changes from "0" to "1" and from "1" to "0" are obtained when the trailing edges of the cs2 series and the cs4-series, respectively, are sliding over the edges of the pulse series cs4/1.

The phase comparator PC shown in FIG. 2 comprises a change-over switch CH, in the form of two AND-gates by means of which the leading edges of the pulse series cs2 and cs4, depending on a logic state "1" "0" respectively being generated from a time counter TC, are transmitted to a gate device GD to control the comparator C described by means of FIG. 1.

The time counter TC, which is arranged to stabilize the reliability device against the above-mentioned slipping in alternating directions and also against reaction time variations of the D-flip-flops FJ1, FJ2 and FJ3, comprises a single-shot element SSE which takes a logic "1"-state when a second exclusive-OR-gate EOR2 is activated. Furthermore the time counter comprises two D-flip-flops FJ4 and FJ5, the outputs of which are connected to the second exclusive-OR-gate EOR2. In addition, the output of the D-flip-flop FJ4 is connected to the inputs of the change-over switch CH and D-flip-flop FJ5.

The D-flip-flop FJ4 has its input connected to the first exclusive-OR-gate EOR1 and is clocked by means of an AND-gate AND by such trailing edges of the pulse series cs2 which do not coincide with the time t established by the single-shot element SSE. The D-flip-flop FJ5 is clocked by the leading edges of the cs2 pulse series.

Figure 3B:
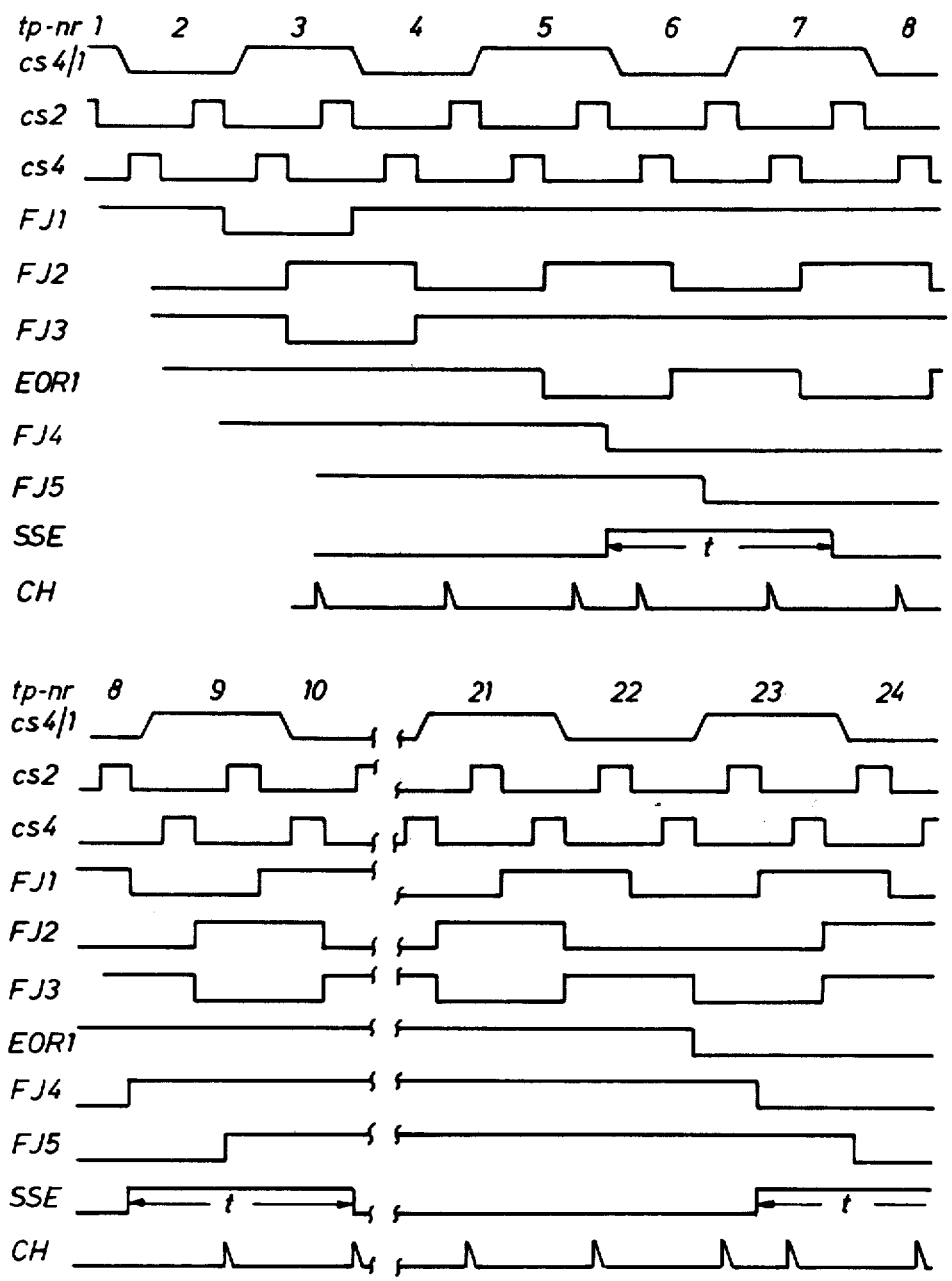

FIG. 3b contains timing diagrams for describing the following example of an oscillator sliding: The pulse series cs4/1, the timing periods of which are numbered 1 to 10 and 21 to 24, is generated by an oscillator frequency sliding in alternating directions, and the clock pulse series cs2 and cs4 are generated by a constant oscillator frequency. Those of the numbered timing periods having the numbers 1, 2, 3, 4 and 6 are shorter and those periods having the rest of the numbers are longer than the timing periods belonging to the cs2 and the cs4 pulse series. Between the timing periods 3 and 8 the trailing edges of the cs2 pulse series are sliding in an alternating direction over the unreliable period parts of the cs4/1 pulse series. In addition, two trailing edges of the cs4 pulse series occur during the timing period 22, the first one immediately after and the second one immediately before respective unreliable period parts.

The first exclusive-OR-gate EOR1 changes its logical state during each of the timing periods 5 to 8 and at the end of the timing period 22. The D-flip-flop FJ4 changes its state, however, due to the single-shot element SSE being activated during the time t, only at the end of the timing period 5 and during the timing periods 8 and 23. The D-flip-flop FJ4 controls the change-over switch CH in such a manner that the gate device GD is activated during the timing periods 3, 4, 5, 9, 10, 21 and 22 by means of respective leading edges of the cs2 pulse series and during the timing periods 6, 7, 8 and 24 by means of respective leading edges of the cs4 pulse series. During the timing period 23 the gate device GD is activated due to the present oscillator sliding both by means of the cs2 pulse leading edge and the cs4 pulse leading edge.

It should be noted that FIG. 3b shows a large sliding rate which does not occur in practice. The change of the sliding direction treated during the timing periods 5 to 7 extends in practice over a much larger number of timing periods. Therefore in practice the characteristic time t for the single-shot element is chosen to comprise 32 timing periods. Futhermore it should be noted that the unreliable period parts are very small with respect to the pulse width of the series cs2 and cs4. By performing the phase comparison by means of the trailing edges of the cs2 and the cs4 pulse series and by activating the gate device GD by means of respective leading edges, a stable working method for the reliability device is guaranteed.

The data device GD either controls the transfer of address numbers from the two address counters ACw and ACr to the comparator C as is shown in FIG. 2 or the transfer of the break signals from the comparator C to the pulse treatment circuits PTC of the two computer systems.

We claim:

1. An address and break signal generator in a processing complex which includes a buffer memory with a fixed number of addressed registers, a sending computer system for sending information to the buffer memory in response to an information transfer signal, a receiving computer system for receiving information from the buffer memory in the response to an information transfer signal, each of said computer systems having an oscillator, said oscillators having the same nominal frequency but not being mutually synchronized whereby they slip with respect to each other, each of said computer systems having a clock generator for generating a set of series of clock pulses, the clock pulses of each series having a given phase difference with respect to the clock pulses of the other series, the clock pulses of one of the series for each computer system establishing the timing periods for that computer system, each timing period having a reliable part during which operations can be reliably performed and an unreliable part during which operations are unreliably performed, each of said computer system having a pulse treatment means receiving the break signals and the pulses from said one series which establishes the timing periods for generating information transfer signals only when a pulse from said one series occurs in the absence of a break signal, said address and break signal generator comprising:

(a) a first circulating address counter means having a stepping input connected to the pulse treatment means of the receiving computer system and an address output for transmitting address signals to the buffer memory means, said address signals indicating the addressed register from which information is to be transmitted to the receiving computer means;

(b) a second circulating address counter means having a stepping input connected to the pulse treatment means of the sending computer system and an address output for transmitting address signals indicating the addressed register into which information from the sending computer system is to be stored;

(c) a comparator means for comparing said address signals generated by said first and second address counter means, said comparator means including means for transmitting a break signal to the pulse treatment means of said receiving computer system when the difference between the values represented by said address signals is greater than a given value to inhibit the generation of an information transfer signal by said pulse treatment means and prevent the under-occupancy of the buffer memory means; and said comparator means including means for transmitting a break signal to the pulse treatment means of said sending computer system when the difference between the values represented by said address signals is greater than a given value to inhibit the generation of an information transfer signal by said pulse treatment means and prevent the over-occupancy of the buffer memory means;

(d) reliability means including means performing phase comparisons between the timing periods of the computer systems for controlling said comparator means to transmit break signals only during reliable parts of the timing periods.

2. The address and break signal generator according to claim 1 wherein said reliability means comprises:

a phase comparator means including means for modifying one of the series of clock pulses being used in one of the computer systems and comparing means for comparing said modified series of clock pulses with two series or clock pulses generated of the other of the computer systems during first period parts with a phase displacement to each other which is larger than second period parts, and means for choosing between said two series of clock pulses the series giving the most favorable phase position to the period part limits of the modified pulse series; and gating means connected to said address counter means for transmitting the chosen series of clock pulses to the pulse treatment means of both computer systems.

3. The address and break signal generator according to the claim 2 wherein said comparator means comprises a time counter means for monitoring the chosen series of clock pulses for a definite number of timing periods even if another series of clock pulses has a more favorable phase position.

* * * * *